United States Patent [19]

Harris

[11] 4,116,154
[45] Sep. 26, 1978

[54] BICYCLE DISTANCE SAFETY DEVICE

[76] Inventor: Willie Harris, 1519 - 89th Ave., Oakland, Calif. 94621

[21] Appl. No.: 679,885

[22] Filed: Apr. 26, 1976

[51] Int. Cl.² .............................................. B60Q 1/34
[52] U.S. Cl. ..................................... 116/35 A; 116/52
[58] Field of Search ........... 116/35 R, 2, 28 R, 51–53, 116/35 A; 280/289 R; 273/1 R, 99, 100

[56] References Cited

U.S. PATENT DOCUMENTS

| | | | |
|---|---|---|---|
| 281,624 | 7/1883 | Evans, Jr. | 273/99 |
| 2,540,394 | 2/1951 | Hollingsworth | 116/52 |
| 3,759,516 | 9/1973 | Miller | 273/1 R |
| 3,812,815 | 5/1974 | Kuenzel | 116/28 R |
| 3,945,336 | 3/1976 | Harris | 116/28 R |
| 3,961,596 | 6/1976 | Shiavone | 116/52 X |
| 3,967,575 | 7/1976 | Coutts | 280/289 R X |
| 3,972,302 | 8/1976 | Sherman | 116/28 R |

*Primary Examiner*—Daniel M. Yasich

[57] ABSTRACT

A bicycle safety device indicates not only the presence of a bicycle but the minimum distance that should be maintained by other vehicles in passing the bicycle. The safety device includes a support member that mounts to the bicycle frame immediately below the bicycle seat on the seat elevation-adjustment-bolt and extends parallel with the side of the bicycle frame and forms a right angle at the end. The parallel member includes reflector means on both of it's sides and an indicating member attached to said parallel support member and extends outwardly horizontal from the side of the bicycle frame a predetermined distance. Said horizontal member may be shaped into two or more arrows to create an illusion of a moving arrow and may be built out of reflector-type sheet metal, and will protect the bicyclist from all four directions, namely, north, south, east and west, because both of said members comprise reflector means on both of the sides.

4 Claims, 6 Drawing Figures

BICYCLE DISTANCE SAFETY DEVICE

BACKGROUND AND SUMMARY OF THE INVENTION

This invention relates to a new and improved safety device for indicating the presence of a bicyclist to a passing motorist, and in particular, to a safety device that is attachable to the frame of a bicycle which includes a parallel support member that extends parallel beside the bicycle frame and attaches to a horizontal member outwardly extending from the side of the bicycle, and said horizontal member may be shaped into two or more arrows to create an illusion of a moving arrow, and said horizontal member being continuously reflectorized the full length of said horizontal member to eliminate blind, non-reflectorized portions of the horizontal member, between the bicycle frame and the outer extending end of said horizontal indicating member which is important because the motorist can better determine the exact location of the bicycle at night or on dark days. This is important in preventing an accident. And when the parallel support member and the horizontal indicating member are connected to each other to form the bicycle distance safety device, said safety device protects the bicyclist from all four directions.

While other safety devices have been invented for indicating the presence and distance from the bicycle that should be maintained when passing a bicycle, they are deficient in performing their intended purpose effectively, for example, one method of indicating the presence and distance to pass a bicycle is by placing a flag on one end of a flag pole and attach the other end of said pole to the bicycle frame; this is deficient because it leaves a blind, non-reflectorized portion of said pole between the bicycle frame and the flag on the end of said pole, and the cyclist must also stop the bicycle to change the position of said pole, this is dangerous because the motorist can easily miss recognize on which side of the bicycle said pole is located. And stopping to change positions of said pole can cause an accident, because the bicyclist may make a stop in front of a non-suspecting speeding motorist and cause an accident. Therefore, one of the objects of the present new and improved invention is to eliminate said dangers by providing a horizontal indicating member that extends outwardly from the side of the bicycle a predetermined and safe distance pass the handlebar of the bicycle, and said member is shaped into two arrows and continuously reflectorized on both sides of same member immediately beside the bicycle frame and continuing the full length of said horizontal member. The specific constructional details also constitute an object of this invention.

A further object of the present invention is to provide a new and improved safety device over my original Bicycle Distance Safety Device U.S. Pat. No. 3,945,336 by providing the following improvements:

(1) A safety device that comprises smaller and fewer parts for light weight and easy carrying.

(2) A safety device that comprises a horizontal indicating member that is immediately accessible to the reach of the bicyclist hand, and may be flipped to either side of the bicycle frame without stopping the bicycle.

(3) A horizontal indicating member that is shaped into two arrows and reflectorized continuously the full length of said member, to create an illusion of a moving arrow and to eliminate blind non-reflectorized area between the bicycle's frame and the end of said member so that a motorist can better recognize the exact location of the bicycle and prevent an accident.

(4) A safety device that can be seen more clearly on dark days and at night.

(5) A safety device that provides the bicyclist with protection from all four directions, namely, north, south, east and west.

(6) A parallel support member that comprises reflector means on both sides and in front and a horizontally indicating member that is reflectorized on both front and back sides of same member and when both of said member are connected to form the bicycle distance safety device, the safety device protects the bicyclist from four directions.

The above named improvements will become better understood by studying the accompanying drawings and other data that will follow.

DESCRIPTION OF THE PREFERRED EMBODIMENT

Figure 1:
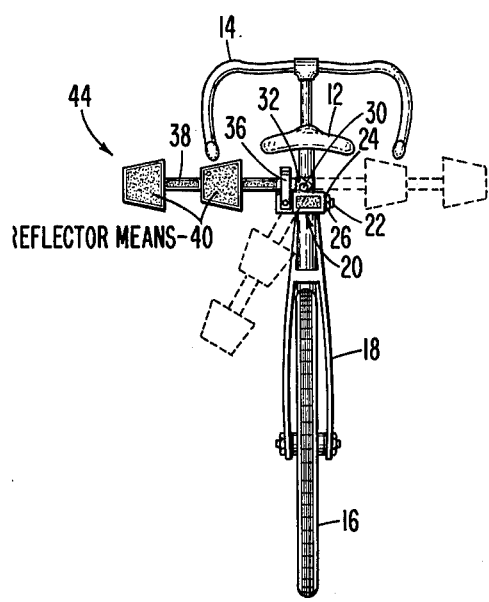
FIG. 1 is a rear horizontal view of the bicycle distance safety device attached to the bicycle frame. Also shows the ability of the horizontal indicating member to flip to either side of the bicycle frame, and the ability of said indicating member to let down beside the bicycle frame.
Figure 2:
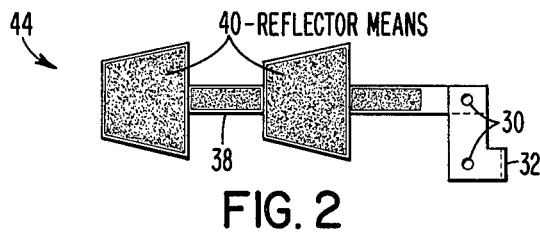
FIG. 2 shows the horizontal indicating member detached from the parallel support member, and shows how said member is reflectorized viewing it from the rear of the bicycle.
Figure 2A:
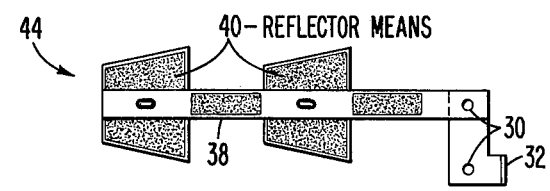
FIG. 2A shows the horizontal indicating member detached from the parallel support member, and shows how it is reflectorized when viewing said member from the front of the bicycle.
Figure 3:
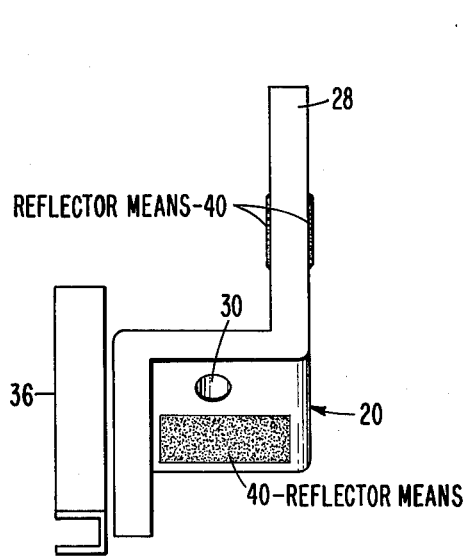
FIG. 3 is a plan view of the parallel support member showing reflector means attached to both sides, and in front, also shows a support lever attached to Z-shaped angle, and an aperture through same Z-shaped member.
Figure 4:
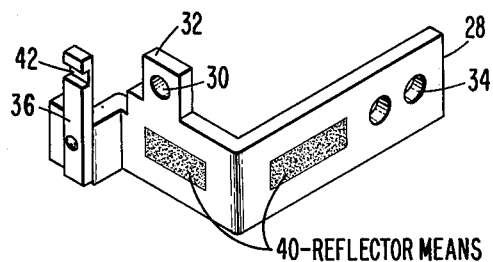
FIG. 4 is a perspective view of the parallel support member to show how the connecting-piece 32 is built into same member.
Figure 5:
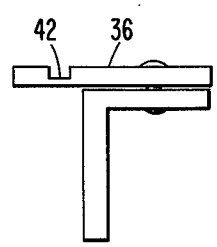
FIG. 5 is a cross sectional view of FIG. 4 along line 2—2.

Referring to FIG. 1 of the drawings is a bicycle 10 which includes a seat 12 and a handlebar 14 and rear wheel 16 and frame 18. The safety device 20 is attached to the bicycle frame 18 immediately below the bicycle seat 12 on the seat elevation-adjustment-bolt 22 and secured by means of a lock washer 24 and nut 26. The safety device 20 of FIG. 1 includes a parallel support member 28 (FIG. 3) parallel to the horizontal bar which extends between the seat and the front part of the bicycle and is formed into a right angle at one end then extends outwardly a few inches where said angle comprises an aperture 30 in the slightly elevated portion 32 of it, for attaching the horizontal indicating member 38 to said parallel support member. The parallel support member 28 comprises holes 34 for selective attachment of it to the seat-elevation-adjustment-bolt 22. The parallel support member 28 further comprises a lever 36 for holding the horizontal indicating member 38 in position on the left side of the bicycle frame 18 as shown in FIG. 1 along line 2—2. Said member 38 also comprises reflector means 40 on both sides and in front. The horizontal indicating member 38 is connected with the parallel support member 28 at aperture 30 as shown in FIG. 1 by means of a rivet or the like (rivet or the like not shown) the horizontal indicating member 38 will swing to either side of the bicycle frame or let down beside the bicycle frame 18, this make the safety device useful on both side of a one-way street as well as two-way streets. The horizontal indicating member 38 is easily accessible to the reach of the bicyclist hand for selecting the desired position while the bicycle is in motion as well as when stopped. The easy accessibility of said horizontal member for selective positioning will prevent an accident because, the bicyclist does not have to make a stop in front of a non-suspecting speeding motorist to change the position of said horizontal indicating member 38. The horizontal indicating member 38 is held in horizontal extending position on the right side of the bicycle frame 18 by means of the parallel support member 28 and in horizontal extending position on the left side of said frame by means of a lever 36 located on the end of the parallel support member 28, and locked in position in a groove 42 shown in FIG. 4 of the drawings. The groove 42 will prevent said horizontal member from dropping to a down position on the side of the bicycle frame 18 should it loosing for some reason, where it is connected to said parallel support member by means of a rivet or the like (rivet or the like not shown) at aperture 30 in FIG. 1 of the drawings. The lever 36 moves to the desired position by pushing it by the thumb to allow the horizontal indicating member 38 to let down on the side of the bicycle frame 18 as shown in FIG. 1 of the drawings. Referring to FIG. 1 of the drawings, the horizontal indicating member 38 is shown extending outwardly horizontal a predetermined distance pass the handlebar 14. This will assure the passing motorist that when he misses hitting the horizontal indicating member 38 he will also positively miss hitting the bicycle 10. The horizontal indicating member 38 comprises two arrow shaped reflector means 44 that begin immediately beside the bicycle frame 18 and extend the full length of said horizontal member, the two arrow-shaped reflector means are to create an illusion of a moving arrow for better attention as well as to eliminate any blind portion of said member between the bicycle frame 18 and the end of said horizontal indicating member, and to further prevent accidents by it's improved visibility. Said horizontal member is reflectorized on both sides as shown in FIG. 2 along line 3—3, and FIG. 2A along line 4—4. When said horizontal indicating member is connected to the parallel support member 28 the present invention will protect the bicyclist substantially from all four directions, namely, north, south, east, and west, which can better be understood by referring to FIG. 1 in conjunction with FIGS. 2 and 2A of the drawings. Referring further to the constructional details of the present invention, the connecting-piece 32 may be built into the parallel support member 28 and connected to the horizontal indicating member 38 as shown in FIG. 1 of the drawings. Another method of connecting the horizontal indicating member 38 to the parallel support member 28 is to attach the connecting-piece 32 to said horizontal indicating member, as shown in FIG. 2, and connect said horizontal member to said parallel support member at aperture 30 shown in FIG. 3 of the drawings. Referring further to FIG. 3, the parallel support member 28 is Z-shaped on it's end opposite to where it connects to the bicycle frame. A lever 36 is also attached to said Z-shaped angle by means of a rivet or the like (rivet or th like not shown) said lever flips backwardly to allow the horizontal indicating member 38 to let down on the side of the bicycle frame. Said lever flips forwardly to enable said horizontal indicating member to extend outwardly horizontal from the left side of the bicycle frame. It is well known that bicycle handlebars vary in size, therefore, the present safety device is built to a medium eg. to fit most bicycles. For bicycles having larger or smaller than standard size handlebars, a simple solution to that problem is to add or subtract from a few inches from the horizontal indicating member 38.

While the foregoing disclosure is offered for public dissemination in return for the grant of a patent. And although it is detailed to insure adequacy and aid understading, it is not intended to prejudice that purpose of a patent which is to cover each new inventive concept therein no matter how others may later disguise it by variation in form or addition or further improvement.

That what is claimed is:

1. A bicycle distance safety device which indicates not only the presence of a bicycle but also the minimum distance that should be maintained by others in passing the bicycle, the safety device includes a Z-shaped support member that mounts at one end of the frame of a bicycle immediately below the bicycle seat on an seat-elevation-adjustment-bolt, and the support member extends parallel to the horizontal front bar of the bicycle frame and forms a right angle at it's end, a portion of said member is to be L-shaped, a horizontal indicating member is pivotally attached to said parallel support member at said L-shaped angle portion and extends in a lateral outwardly horizontal portion from the side of the bicycle frame a predetermined distance beyond the lateral extension of handlebar of said bicycle, means maintaining said indicating member in said lateral extended position, thus assuring a motorist that by miss hitting said horizontal indicating member the motorist will positively miss hitting the bicyclist, said horizontal indicating member comprises two long-angle arrow-shaped means and reflector material that extends the full length of said horizontal indicating member, whereby manual movement of said indicating member will create an illusion of a moving arrow for better attention getting to prevent an accident, the parallel support member of said safety device also includes the reflector material on both sides and in front to provide three-way protection, the horizontal indicating member and the parallel support member are connected together to form the pivotally movable bicycle distance safety device whereby the safety device provides selective four-way indicating protection for the bicyclist.

2. A safety device of claim 1 that comprises a horizontal member that is immediately accessible to the reach of the bicyclist hand and is flipped to either side of the bicycle frame and is let down on the side of the bicycle frame without having to stop the bicycle.

3. A safety device of claim 1 whereby said maintaining means includes a parallel support member that comprises a built-in end-piece for attaching the horizontal indicating member to said parallel member, said parallel support member also having a lever attached thereto, and said lever comprises a groove at it's end for locking said horizontal indicating member in horizontal extending position.

4. A parallel support member of claim 3 that mounts to the frame of a bicycle and comprises holes for selective attachment, and is Z-shaped on it's end and comprises an aperture therethrough to enable attachment of the horizontal indicating member shown in FIGS. 2 and 2A of the drawings, said Z-shaped-end also comprises a lever attachment to hold said horizontal indicating member in horizontal extending position.

* * * * *